United States Patent
Sweet et al.

(10) Patent No.: US 8,304,929 B2
(45) Date of Patent: Nov. 6, 2012

(54) INVERTER WITH NETWORK INTERFACE

(75) Inventors: Benjamin D. Sweet, West Bloomfield, MI (US); Raymond Hanjaya, Canton, MI (US); William Cruickshank, Rochester Hills, MI (US); Aftab Ali Khan, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 664 days.

(21) Appl. No.: 12/487,056

(22) Filed: Jun. 18, 2009

(65) Prior Publication Data

US 2010/0320836 A1  Dec. 23, 2010

(51) Int. Cl.
*B60L 1/00* (2006.01)
(52) U.S. Cl. ......................................................... 307/9.1
(58) Field of Classification Search ..................... 307/9.1
See application file for complete search history.

(56) References Cited

U.S. PATENT DOCUMENTS

| | | | |
|---|---|---|---|
| 5,963,442 A | 10/1999 | Yoshida et al. | |
| 6,411,534 B1 * | 6/2002 | Kurnia et al. | 363/98 |
| 6,617,820 B2 * | 9/2003 | Carlson et al. | 318/727 |
| 6,807,072 B2 | 10/2004 | Tanabe et al. | |
| 7,012,401 B2 | 3/2006 | Ohkouchi et al. | |
| 7,138,773 B2 | 11/2006 | Kumar | |
| 7,154,314 B2 | 12/2006 | Lance | |
| 7,218,539 B2 | 5/2007 | Ely et al. | |
| 7,277,304 B2 | 10/2007 | Stancu et al. | |
| 7,336,510 B2 | 2/2008 | Ely et al. | |
| 7,372,712 B2 | 5/2008 | Stancu et al. | |
| 7,414,439 B2 | 8/2008 | Sicard | |
| 2004/0022276 A1 | 2/2004 | Gazier et al. | |
| 2007/0284159 A1 | 12/2007 | Takami et al. | |
| 2008/0068770 A1 | 3/2008 | Kiuchi | |
| 2008/0254329 A1 * | 10/2008 | Sugiura et al. | 429/22 |
| 2009/0315393 A1 * | 12/2009 | Yeh | 307/10.1 |

* cited by examiner

*Primary Examiner* — Hal Kaplan
(74) *Attorney, Agent, or Firm* — Brooks Kushman P.C.

(57) ABSTRACT

An inverter configured for use within a vehicle to power consumer electronic devices and other types of devices requiring single-phase, AC energy. The inverter may include a network interface or other type of the connection to a vehicle data bus or other message exchange system in order to communicate with an electronic control unit (ECU) or other feature included within the vehicle to monitor and control energy consumption by one or more vehicle subsystems.

19 Claims, 2 Drawing Sheets

_US 8,304,929 B2_

INVERTER WITH NETWORK INTERFACE

BACKGROUND OF THE INVENTION

1. Field of the Invention

The present invention relates to inverters of the type suitable for inverting DC energy into single-phase AC energy, such as but not limited to the type suitable for inverting DC energy provided by a vehicle battery into single-phase AC energy suitable for powering a consumer electronic device.

2. Background Art

A vehicle electrical system typically relies upon an energy source to supply energy for powering a plurality of vehicle subsystems during normal vehicle operations. The amount of energy available from the energy source can vary during vehicle operation depending on the number of subsystems requesting energy and the ability of the energy source to maintain its energy output. Some vehicles employ an electronic control unit (ECU) to manage energy levels so that more critical subsystems are supplied energy before less critical subsystems, to insure limp-home capabilities, and to otherwise manage/regulate energy consumption.

The consumption of energy by the vehicle subsystems can be monitored by the ECU and tracked over time such that the ECU has an understanding of the amounts of energy required by the vehicle subsystems in order to operate under various operating conditions. The ECU can use this information and/or other strategies to selectively authorize one or more of the vehicle subsystem to consume energy (or otherwise regulate energy consumption) from the energy source. This may include the ECU exchanging messages and other data through a vehicle bus or other vehicle-based medium with the vehicle subsystems, or an associated controller, in order to selectively enable or disable (or limit) the vehicle subsystems.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
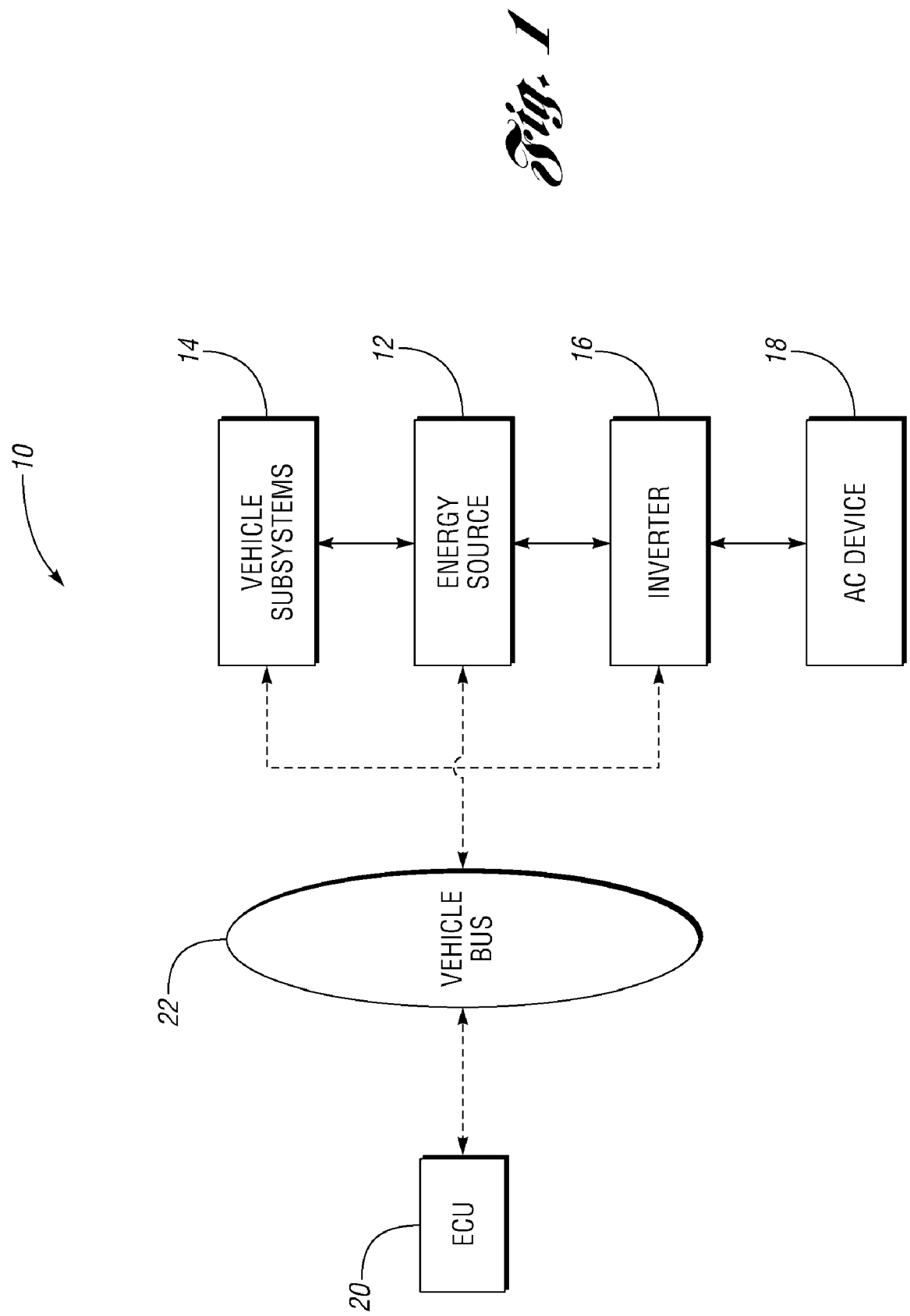
FIG. 1 illustrates a vehicle electrical system in accordance with one non-limiting aspect of the present invention.

FIG. 1 illustrates a vehicle electrical system 10 in accordance with one non-limiting aspect of the present invention. The system 10 may include an energy source 12 for providing energy to a plurality of vehicle subsystems 14 where at least one of the subsystems is an inverter 16 configured to output single-phase AC energy to a consumer electronic device or other AC operable device 18. An electronic control unit (ECU) 20 may be included to regulate and/or otherwise manage energy consumed from the energy source 12 by the vehicle subsystems 14 and inverter/device 16, 18. A vehicle network 22, such as but limited to a Controller-Area Network (CAN) or Local Interconnect Network (LIN) bus, may be used to facilitate message and other data exchange between the ECU 20 and the vehicle subsystems 14, inverter 16, and AC device 18.

The ECU 20 may be configured to execute any type of load control strategy, such as but not limited to a load shedding strategy of the type that controls energy consumption based on energy available from the energy source 12 and the functionality of vehicle subsystem 14, 16 requesting energy such that more critical vehicle subsystems 14, 16 are powered before less critical subsystem. The load shedding strategy may operate in real-time so that the ECU 20 can continuously enable, disable, and otherwise manage energy consumed by the vehicle subsystem 14, 16 according to the amount of energy currently available from the energy source 12 or likely to be available within the future. This may include disablement of less critical subsystem 14, 16 when energy levels run low, implementing limp-home functionality when energy levels are critically low, and/or otherwise specifying energy consumption limits.

The energy available from the energy source 12 may be dependent on the vehicle and its configuration for charging the energy source 12 and the configuration of the energy source 12 to maintain/distribute energy. For example, if the energy source 12 is a DC battery, capacitor, or other passive storage device charged by a vehicle alternator (not shown) or if the energy source is a fuel cell or other renewable energy source (not shown), the amount of available energy may fluctuate depending on ambient temperature, starter motor "cranking" state, vehicle payload (weight), switching on and off of energy consuming devices, and any number of other operating conditions that may change the amount of current drawn from the energy source 12 by various vehicle subsystems 14, 16.

Figure 2:
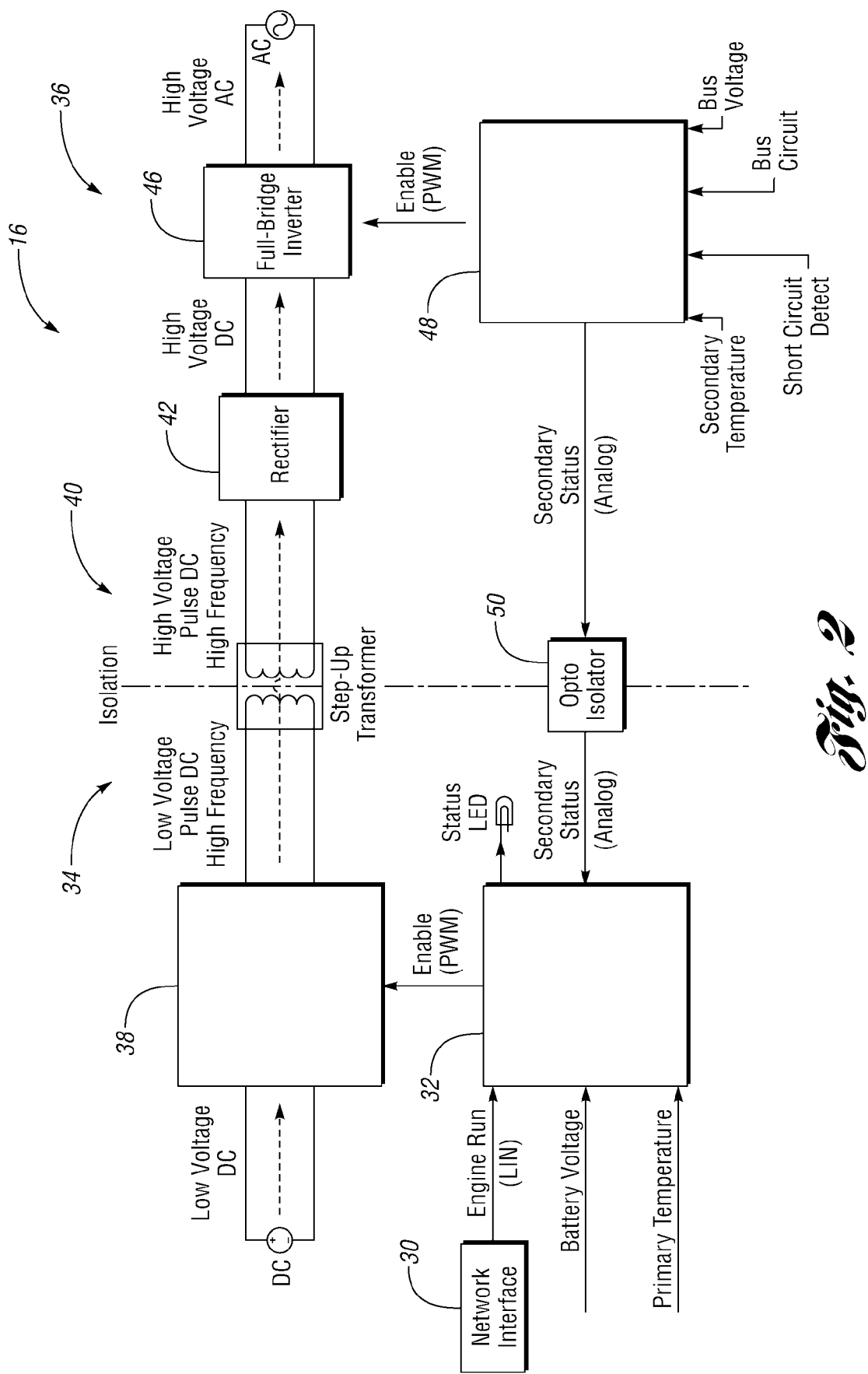
FIG. 2 illustrates an inverter being configured to include a network interface in accordance with one non-limiting aspect of the present invention.

The present invention, however, is not intended to be limited, unless otherwise noted, to any particular energy source 12 or means for charging the energy source 12. The present invention full contemplates to the use of any energy source 12 having capabilities for providing a DC voltage to the inverter 16 in a manner sufficient of the inverter to output a single-phase AC voltage of the type suitable for powering most consumer electronic devices, e.g., 110/120/220V ac at 50/60 Hz. The inversion performed by the inverter 16 may be accomplished with any suitable inverter configuration. FIG. 2 illustrates the inverter 16 contemplated by one non-limiting aspect of the present invention being configured to include a network interface 30 to support message exchange with the ECU 20 and/or other devices connected to the vehicle network 22.

The network interface 30 may be configured to allow the inverter 16 to interface with the ECU 20 through an exchange of one-way or two-way messages and according to any suitable protocol. The exposure of the inverter 16 to the ECU 20 can be helpful in allowing the ECU 20 to control energy consumption of the inverter 16, and in some case, to set operating controls for the inverter 16 according to load shedding and other control techniques used by the ECU 20 to manage energy consumption of the vehicle electrical system 10. The network interface 30 may be configured to send and/or receive messages over the vehicle network 22 according to any desirable architecture, such as but not limited to that required to support local interconnect network (LIN) version 2.1.

The network interface 30 may be connected to a primary stage microcontroller 32 used to control a primary stage wherein the DC battery voltage is boosted to a greater DC voltage. The primary stage may include a DC/DC converter 34 configured to boost a DC voltage from the energy source 12 prior to inversion by a DC/AC inverter 36 included in within a secondary stage. The DC/DC converter 34 may be configured as a push-pull converter where a chopper 38 operates in response to related DC/DC control signals to control switching operations of switching elements (not shown) that operate in cooperation with a transformer 40 to output a boosted DC voltage to a rectifier 42 where it is rectified into the boosted DC output voltage provided to the DC/AC stage. While the push-pull configuration is illustrated, the present invention fully contemplates the use of other configuration for the primary stage.

The DC voltage output from the primary stage may be inverted in the secondary stage to the single-phase AC voltage used to power the AC device 18. A full-bridge inverter 46 may be used to invert the DC output from the primary stage according to control a number of switching devices operable in response to DC/AC control signals received from a secondary stage microcontroller 48. The DC/AC control signals may be set to invert the DC output to any suitable single-phase AC voltage. Optionally, the secondary controller 48 may select the AC voltage and frequency depending on the connected device 18, such as by user input and/or wireline or wireless communication with the device 18.

An opto-isolator 50 may be included between the primary and secondary stage microcontrollers 32, 48. The opto-isolator 50 may be of the type that allows optical data signals to be transmitted between the microcontrollers 32, 48 without requiring the microcontrollers 32, 48 to be electrically connected to each other. The configuration of primary and second side windings of the transformer 40 may cooperate with the opto-isolator 50 to facilitate electrically isolating the primary microcontroller 32 from the secondary microcontroller 48. This isolation can be helpful with the electronic communications carried out through the network interface 30 since it prevents interference caused by the switching operations of the second stage from interfering with communications taking place on the vehicle network 22.

The primary and secondary stages may include sensors or other feedback to facilitate monitoring and controller related switching operations and/or to facilitate implementing energy consumption strategies. The primary microcontroller 32 is shown to receive a battery voltage value and a primary temperature value. The battery voltage value is used to represent the DC voltage input to the primary stage and to facilitate related controls to insure the desired DC output voltage is provided to the secondary stage for the given DC input voltage. The primary temperature value represents a temperature of the primary stage and may be used by the primary microcontroller to control automatic shutdown and/or output reductions in the event the temperature rises above a desired operating range. The secondary microcontroller 48 includes similar feedback values to facilitate similar operations. The secondary microcontroller may include an additional short circuit sensor to sense shorts that occur within the AC device 18 and/or though an outlet (not shown) used within the vehicle to removably connect the AC device 18.

As illustrated, the network interface 30 exchanges signals between the vehicle bus 22 and the primary microcontroller 32. The primary microcontroller 32 may then issue related messages or route the received messages, if needed, through the opto-isolator 50 in order to maintain electrical isolation from the stages. The secondary microcontroller 48 may issue messages to the primary microcontroller 32 for communication to the ECU 20. For example, the secondary stage microcontroller 48 may determine an energy demand of the attached load 18 and issue a related message to the primary controller 32 to request the energy necessary to power the load 18. The request may specify voltage levels, power levels, and/or desired frequency for the single-phase AC output. The primary microcontroller 32 may then communicate this request to the ECU 20 for processing. The ECU 20 may respond with an authorization message authorizing output of the requested energy demand or some percentage thereof depending on the parameter set by the load shedding strategy.

The ability of the ECU 20 to transmit messages to, and in some cases, receive messages from one or both of the primary and secondary microcontrollers 32, 48 can be beneficial in allowing the ECU 20 to control any number of operations of the inverter 16. The ECU 20, for example, may be configured to prevent inverter operations until an ignition is changed from an 'off' position to an 'on' position (accessory power and/or engine running) and/or while an engine (not shown) is stopped as a part of a stop/start strategy, such as the type used with hybrid electric vehicles where the engine is stopped under certain circumstances without requiring the ignition to be turned to the off position. The ECU 20 may require the inverter 16 to request start, stop, and modified operations with corresponding message transmissions, such as to require connection of authorized load 18 before inverter 16 operations are permitted, as opposed to always making energy available from the inverter outlet. The ECU 20 may also transmit messages to shutdown or modify inverter operations, such as upon the ignition turning from the on position back to the off position or upon changes in the load shedding strategy. Optionally, the inverter 16 may retain some control over its own operations, such as by delaying shutdown for a period time, e.g. five minutes, after receipt of a shutdown message from the ECU 20.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle inverter configured to invert a first DC voltage provided from a vehicle battery into a single-phase AC voltage suitable for powering a consumer electronic device comprising:
    a housing comprising:
        a DC/DC converter operable to convert the first DC voltage to a second DC voltage in response to DC/DC control signals, the second DC voltage being greater than the first DC voltage;
        a DC/AC inverter operable to invert the second DC voltage to the single-phase AC voltage in response to DC/AC control signals;
        a DC/DC controller configured to output the DC/DC control signals;
        a DC/AC controller configured to output the DC/AC control signals;

a network interface configured to interface messages between a network bus included within the vehicle and at least one of the DC/DC controller and the DC/AC controller; and wherein the DC/DC controller and the DC/AC controller are configured to shutdown in response to an ignition message received over the network bus indicating a position of a vehicle ignition to have changed from an 'on' position to an 'off' position or indicating the vehicle ignition being in the 'on' position and an engine being stopped in accordance with a stop/start strategy.

2. The inverter of claim 1 wherein the DC/DC controller and the DC/AC controller are each configured to delay shutdown for a period of time, the period of time running from receipt of the ignition message.

3. The inverter of claim 2 wherein the period of time is at least five minutes.

4. A vehicle inverter configured to invert a first DC voltage provided from a vehicle battery into a single-phase AC voltage suitable for powering a consumer electronic device comprising:
a housing comprising:
a DC/DC converter operable to convert the first DC voltage to a second DC voltage in response to DC/DC control signals, the second DC voltage being greater than the first DC voltage;
a DC/AC inverter operable to invert the second DC voltage to the single-phase AC voltage in response to DC/AC control signals;
a DC/DC controller configured to output the DC/DC control signals;
a DC/AC controller configured to output the DC/AC control signals;
a network interface configured to interface messages between a network bus included within the vehicle and at least one of the DC/DC controller and the DC/AC controller; and
wherein the DC/DC controller and the DC/AC controller are each configured to output the control signals in response to an ignition message received over the network bus indicating a position of a vehicle ignition to have changed from an 'off' position to an 'on' position.

5. A vehicle inverter configured to invert a first DC voltage provided from a vehicle battery into a single-phase AC voltage suitable for powering a consumer electronic device comprising:
a housing comprising:
a DC/DC converter operable to convert the first DC voltage to a second DC voltage in response to DC/DC control signals, the second DC voltage being greater than the first DC voltage;
a DC/AC inverter operable to invert the second DC voltage to the single-phase AC voltage in response to DC/AC control signals;
a DC/DC controller configured to output the DC/DC control signals;
a DC/AC controller configured to output the DC/AC control signals;
a network interface configured to interface messages between a network bus included within the vehicle and at least one of the DC/DC controller and the DC/AC controller; and
wherein the DC/DC controller is configured to regulate a voltage level of the second DC voltage according to a level specified within a message received over the network bus.

6. The inverter of claim 5 wherein the DC/DC controller is configured to regulate the second DC voltage level in real-time according to subsequent messages being received through the network interface to adjust the level.

7. A vehicle inverter configured to invert a first DC voltage provided from a vehicle battery into a single-phase AC voltage suitable for powering a consumer electronic device comprising:
a housing comprising:
a DC/DC converter operable to convert the first DC voltage to a second DC voltage in response to DC/DC control signals, the second DC voltage being greater than the first DC voltage;
a DC/AC inverter operable to invert the second DC voltage to the single-phase AC voltage in response to DC/AC control signals;
a DC/DC controller configured to output the DC/DC control signals;
a DC/AC controller configured to output the DC/AC control signals;
a network interface configured to interface messages between a network bus included within the vehicle and at least one of the DC/DC controller and the DC/AC controller; and
wherein the DC/AC controller is configured to regulate a frequency and voltage level of the single-phase AC voltage according to parameters specified within a message received over the network bus.

8. A vehicle inverter configured to invert a first DC voltage provided from a vehicle battery into a single-phase AC voltage suitable for powering a consumer electronic device comprising:
a housing comprising:
a DC/DC converter operable to convert the first DC voltage to a second DC voltage in response to DC/DC control signals, the second DC voltage being greater than the first DC voltage;
a DC/AC inverter operable to invert the second DC voltage to the single-phase AC voltage in response to DC/AC control signals;
a DC/DC controller configured to output the DC/DC control signals;
a DC/AC controller configured to output the DC/AC control signals;
a network interface configured to interface messages between a network bus included within the vehicle and at least one of the DC/DC controller and the DC/AC controller; and
wherein the DC/DC controller outputs the DC/DC control signals only after receipt of an authorization message through the network interface.

9. The inverter of claim 8 wherein the DC/DC controller transmits a request message over the network interface to request the authorization message.

10. The inverter of claim 9 wherein the request message specifies an energy demand that is representative of an amount of energy needed by the consumer electronic device to operate.

11. The inverter of claim 10 wherein the authorization message specifies a percentage of the energy demand the DC/DC controller is authorized to support.

12. The inverter of claim 10 wherein the DC/DC controller determines the energy demand request from a message communicated to the DC/DC controller by the consumer electronic device.

13. The inverter of claim 1 further comprising an outlet configured to electrically and mechanically connect to a plug of the consumer electronic device.

14. A system for using energy supplied by a DC battery included within a vehicle to power a removably connected device requiring a single-phase AC voltage, the system comprising:
- an electronic control unit (ECU) configured to implement a load shedding strategy to regulate energy consumption of a plurality of subsystems included within the vehicle, the load shedding strategy requiring the ECU to selectively authorize each of the subsystems to consume energy from the DC battery depending on an amount of energy available from the DC battery, the ECU transmitting an authorization message to each of the plurality of subsystems authorized to consume energy from the DC battery;
- a vehicle bus configured to enable the transmission of the authorization messages between the ECU and the subsystems; and
- an inverter configured to invert energy consumed from the DC battery into the single-phase AC voltage needed to power the removably connected device, the inverter including a network interface to the vehicle bus, the inverter becoming operational to generate the single-phase AC voltage upon receipt of one of the authorization messages transmitted from the ECU over the vehicle bus.

15. The system of claim 14 wherein the inverter is configured to cease generation of the single-phase AC voltage upon receipt of a disable message transmitted from the ECU over the vehicle bus.

16. The system of claim 15 wherein the inverter is configured to remain operational for at least five minutes after receipt of the disable message.

17. The system of claim 14 wherein the inverter is configured to request the authorization message from the ECU with a request message transmitted through the network interface and to specify an energy demand within the request message, the energy demand indicating an amount of energy need to power the device.

18. The system of claim 17 wherein the ECU is configured to issue the authorization message to the inverter in the event the energy demand does not require a total energy demand on the battery to exceed the amount of energy available from the battery and an amount of energy specified in the load shedding strategy for powering more critical subsystems.

19. A method of controlling operation of an inverter included within a vehicle to invert DC energy to AC energy of the type suitable for powering a consumer electronic device, the method comprising:
- receiving an engine running message over a vehicle bus connected to the inverter, the engine running message indicating an engine of the vehicle to running in a manner specified within a load shedding strategy to support providing the DC energy required by the inverter to power the consumer electronic device; and
- preventing the inverter from output of the AC energy in the absence of the engine running message.

* * * * *